Figure 1:
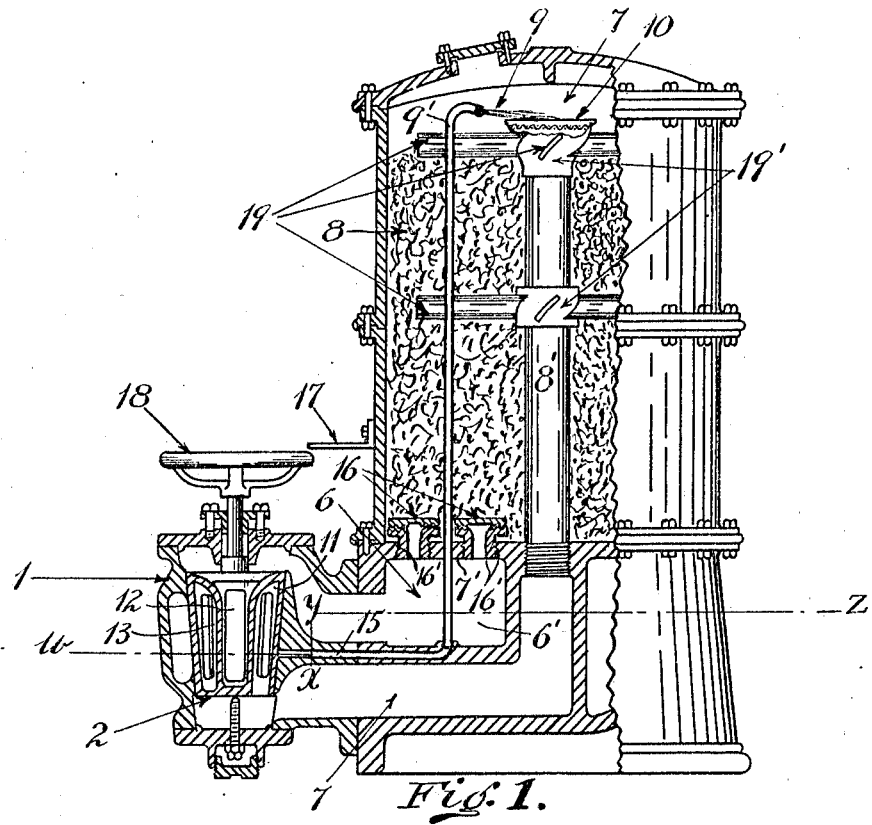

P. S. WARD.
FILTER AND CONTROLLING VALVE THEREFOR.
APPLICATION FILED JUNE 7, 1909.

956,914.

Patented May 3, 1910.

Witnesses
T. Fitzhugh Knox.
A. M. Murray.

Inventor
Paul S. Ward
by Shepherd & Campbell
Attorney

UNITED STATES PATENT OFFICE.

PAUL STERLING WARD, OF COVINGTON, KENTUCKY, ASSIGNOR TO LYNN-SUPERIOR COMPANY, OF CINCINNATI, OHIO, A CORPORATION OF OHIO.

FILTER AND CONTROLLING-VALVE THEREFOR.

956,914. Specification of Letters Patent. Patented May 3, 1910.

Application filed June 7, 1909. Serial No. 500,769.

*To all whom it may concern:*

Be it known that I, PAUL S. WARD, a citizen of the United States, residing at Covington, in the county of Kenton and State of Kentucky, have invented certain new and useful Improvements in Filters and Controlling-Valves Therefor, of which the following is a specification.

This invention relates to means for controlling and cleaning what are known as self-cleansing granular bed filters intended primarily for use in filtering water, though they may be used to filter other fluids if desired.
Filters are known wherein provision is made for introducing the water in the normal direction for filtering and for reversing the direction of flow of the current of water for washing or cleansing the filter, as well as providing for "filtering to waste" and for by-passing the water direct from the supply inlet to the service line. The structure herein shown and described provides in addition to means for carrying out these functions, an emergency drain for the service line as well as means for draining the entire filter when it is desired to remove the old filtering material and substitute new filtering material therefor; or in the event of any accident to the internal construction of the filter, it permits of the entire dismantling of the filter proper without any derangement of the piping connections thereof. It has furthermore been found that in filtering heavy or very dirty waters, a considerable deposit of mud or sludge accumulates upon the surface of the filtering material and penetrates the same to some depth, forming a sticky conglomerate mass which it is difficult to break up, said mass sometimes rising as a unit and blanketing what is normally the inlet opening of the filter, but which opening in the washing operation constitutes the outlet. This cake of sludge is in some forms of filters, broken up by the use of mechanical hand or machine operated agitators. In the present device, I provide horizontally disposed arms or propeller blades which perform the double function of causing a rotary agitation of the suspended filtering medium during the washing operation and also by reason of the location of some of said blades, above the filtering medium, causing primarily a breaking up of the sludge or cake formed on the top surface of the filtering material. I also provide a nozzle in communication with a high pressure water supply, said nozzle being so located as to direct a jet therefrom upon the space immediately adjacent the normal inlet opening, preventing clogging of said opening by any chance mass of sludge which might lodge thereon. This jet is in active service at all times automatically, when the controlling valve is opened for flow of water.

Since, in filtering some waters it is found desirable to use very fine grades of sand, quartz, bone-carbon, or other similar material, and since it is difficult to prevent the filtering material from passing through the diaphragm supporting it, along with the pure water, I have provided a sand stopping valve which comprises water passages between contiguous corrugated surface, these valves causing the water in passing to make a number of abrupt turns. This prevents any of the grains of filtering material from passing through said valves.

A further object of the present structure is that the main controlling valve stands with its axis vertical, thereby presenting a much smaller chance of the lodgment of sand or grit in the moving ports lying against the surface of the valve casing that constitutes the seat of the valve, thereby protecting this seat in a large measure from abrasion by such foreign particles.

Further objects and advantages of the invention will be set forth in the detailed description which now follows.

Figure 2:
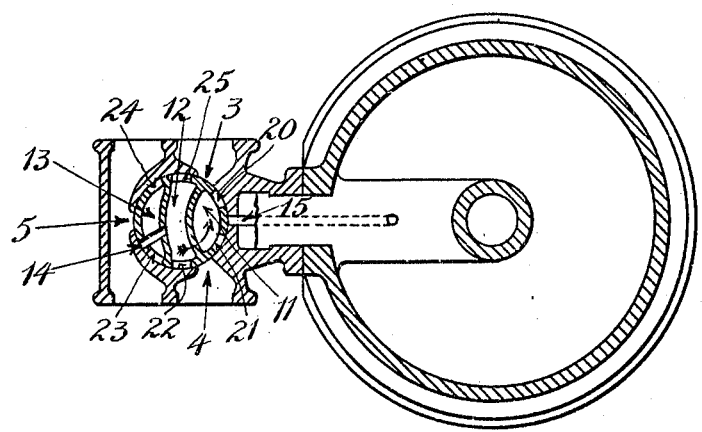

In the accompanying drawing, Figure 1 is a view partly in side elevation and partly in vertical section of a filter and its controlling valve, and Fig. 2 is a transverse section upon line *w—x—y—z* of Fig. 1.

Like numerals designate corresponding parts in both of the figures of the drawing.

Referring to the drawing, the numeral 1 designates a valve casing having a valve 2 mounted to turn therein. The valve casing is provided with an inlet or supply port 3 to which water may be conducted from any suitable source of supply, and an outlet or service port 4 from which water may be conducted to the service line. A chamber 5 of the valve casing is adapted to be put into communication with the drain line. The body of the filter proper is divided in its lower portion by a wall 6' into the chambers 6 and 7. A transverse partition 7' supports a body of granular filtering material 8. A pipe 8' extends upwardly through the body of the filtering material, the lower end of said pipe being in communication with the chamber 7. The upper end of the pipe is covered by a screen 10 upon which a jet of water 9 is discharged through the nozzle end of a pipe 9'. It will be seen that the valve 2 is provided with a cavity 11 closed at the top and open at the bottom to communicate with the chamber 7. This valve is also provided with a cavity 12, closed at the bottom and open at the top to be at all times in communication with the chamber 6. The valve is also provided with a cavity 13 closed both at the top and bottom. A short pipe 14 extends across the cavity 13 and serves a purpose which will be hereinafter set forth. A port 15 extends from the seat of the valve 2 and communicates with the pipe 9'. The caps 16 of sand stopping valves are slightly spaced from the body portions 16' of said valves, and the adjacent faces of the caps and body portions are corrugated as shown.

17 is a pointer secured to the side wall of the filter, the ends of said pointer serving to indicate upon the face of the hand wheel 18, the degree to which said hand wheel has been turned. Suitable indicating matter (not shown) may be placed upon the face of this hand wheel if desired.

19 designates the agitating blades set at an angle and mounted upon hubs 19'. These blades being set at an angle tend to deflect and consequently to agitate the water that flows past them and to consequently agitate the filter bed.

Ports 20 and 21 are formed in the wall of the valve 2 and establish communication between the cavity 11 and the outer face of the valve. Ports 22 and 25 are formed in the wall of the valve 2, and establish communication between the cavity 12 and the outer face of said valve, while ports 23 and 24 also formed in the wall of this valve, extend from the cavity 13 to the outer face of the valve.

The operation of the device is as follows: In the first place, it is to be understood that the valve 2 is capable of being turned to twelve different positions in its seat. In the position shown in the drawing, the flow of fluid is cut off from all of the pipes. One twelfth of the turn in the direction of the arrow in Fig. 2 brings the port 20 into communication with port 3 and simultaneously puts the port 22 into communication with the port 4, and port 21 into communication with port 15. The water now passes through port 3 downwardly through chamber 11, thence through chamber 7, and pipe 8' to the upper chamber 27 of the filter, thence through the filtering material 8, sand valves 16, chamber 6, downwardly through cavity 12 to the service port 4, water at the same time passing through ports 21 and 15 to pipe 9', discharging as a jet against the screen surface 10. Turning the valve to the next position or to the "service drain position", closes supply port 3 and brings the service port 4 in communication with drain 5 through the ports 23 and 24, and chamber 13. This establishes direct connection between the service and rain ports, all other ports being closed. The next positon is that known as "filtering to waste." At this time port 21 is in communication with port 3 and water passes from the supply port 3 through chamber 11 to and through the filtering material and out through chamber 12 and port 25 to waste 5. At the same time water is admitted under pressure through the nozzle 9 from the chamber 12, said water being forced in reverse direction through ports 15 and 22 to the waste 5 removing any sediment that tends to lodge in the port 15. The next one-twelfth movement of the valve closes all of the pipe lines simultaneously. The next one-twelfth movement establishes the cleaning condition. At this time port 22 is in communication with port 3 and water passes from the supply port 3 through chamber 12, chamber 6, upwardly through the filtering material, out of pipe 8', through chambers 7 and 11, and out of port 20 to the waste 5. At this time, the auxiliary port or by-pass 14 establishes communication between chamber 12 and port 15 and through this by-pass water under pressure is supplied to the nozzle 9 to destroy any blanket of sludge tending to form on the screen 10. This complete reversal of the direction of flow of the water cleanses the filtering material of all mud, sediment, or sludge that has been deposited upon its upper face while at the same time, the blades 19 agitate the bed of filtering material to permit the ready release of the sediment therefrom. The next one-twelfth turn of the valve establishes direct communication between supply and service pipes through ports 23 and 24 and chamber 13 all of the other passages being at this time closed. The next one-twelfth turn of the valve brings said valve into such position as to drain the top of the filter, and the standing pipe leading thereto. This is accomplished by placing the top of the filter in communiof the casing ports, a supply water nozzle directed into the space above the filtering material, oblique faced propeller-like blades extending transversely above and within the filtering material, and a perforated supporting diaphragm beneath the filtering material.

In testimony whereof I affix my signature in presence of two witnesses.

PAUL STERLING WARD.

Witnesses:
G. B. Mundy,
G. Linnenpohl.

cation with the drain through chambers 7 and 11 and port 21. In the next position of the valve, or when it has been turned one-twelfth farther around, all of the ports are closed. Turning the valve to its next position, drains the bottom of the filter by placing port 22 in communication with the waste 5 through chambers 6 and 12 and port 22. A still further movement of the valve by-passes the water directly to the drain through ports 24 and 23, and chamber 13, thereby furnishing water under pressure through the drain independent of any communication with the filter, to assist in flushing sewers, these sewers sometimes lacking sufficient fall for the free discharge of such volumes of sludge as are sometimes ejected from the filter.

From the foregoing description, it will therefore be seen that the present structure provides in a single valve, means for establishing the following conditions in the order named at the filter: First, a closed condition; second, a filtering from supply to service; third, a drain direct from the service to sewer; fourth, filtering to waste; fifth, closed; sixth, cleansing the filter by reversing the direction of the current flow; seventh, by-passing the water direct from the supply to the service line; eighth, draining the top and standing pipe of the filter; ninth, a closed condition; tenth, draining the bottom of the filter; eleventh, by-passing the water directly from the supply to the drain for flushing the sewer; and a twelfth position which has no practical value. It is however, to be understood that while the elements shown and described are well adapted to serve the purposes for which they are intended, the invention is not limited to the precise construction set forth, but includes within its purview such changes as may be made within the scope of the appended claims.

Having described my invention, what I claim is:

1. In an apparatus for filtering water, a filter chamber, a valve casing connected therewith comprising a three ported body and a valve so ported as to provide for closed, filtering to service, filtering to waste, washing to waste, by-pass to service, drain top, and drain bottom of filter, conditions.

2. In an apparatus for filtering water, a filter chamber, a valve casing connected therewith, comprising a three ported body and a valve so ported as to provide for closed, filtering to service, filtering to waste, washing to waste, by-pass to service, drain top, drain bottom of filter, emergency service pipe drain, and sewer flushing, conditions.

3. In an apparatus for filtering water, a filter chamber, a valve casing connected therewith having ports lined substantially in a row, and a valve coacting with said ports to provide passages for closed, filtering, filtering to waste, washing, by-pass to service, drain top, and drain bottom, conditions.

4. In an apparatus for filtering water, a filter chamber, a valve casing connected therewith having inlet, outlet, and waste ports, lined substantially in a row, a valve having ports disposed in a row to coöperate with said body ports to accomplish closed, filtering, filtering to waste, washing, by-pass, top drain, and bottom drain, conditions.

5. In an apparatus for filtering water, a three ported valve casing, and a valve therein, a filter body comprising chambers for filtered and unfiltered water with filtering material between, and a jet or nozzle in communication with a port of the valve casing and directed into the sediment at top of filtering medium.

6. In an apparatus for filtering water, a filter chamber, a valve having a movable part comprising two cavities in continuous communication respectively with the normal filtering and reverse surfaces of the filtering material.

7. In an apparatus for filtering water, a filter chamber, a valve casing having ports, a valve comprising a movable part having two chambers in continuous communication respectively with the normal filtering and reverse surfaces of the filtering material, and the third chamber constituting a direct passage between either of the casing ports.

8. In an apparatus for filtering water, a valve casing comprising a three ported body and a valve so ported as to provide for closed, filtering, filtering to waste, washing, by-pass, top drain and bottom drain, conditions, and a filter chamber provided with one or more sand valves having water passages formed between interlocking corrugated surfaces.

9. In an apparatus for filtering water, a valve casing having ports, a valve having a movable part comprising two chambers in continuous communication respectively with the normal filtering and reverse surfaces of the filtering material, and the third chamber constituting a direct passage between either of the casing ports, a supply water nozzle directed into a filter chamber, contiguous with top surface of the filtering material, and one or more sand valves having water passages formed between interlocking corrugated surfaces.

10. In an apparatus for filtering water, a valve casing having ports, a valve comprising a movable part having two chambers in continuous communication respectively with the normal filtering and reverse surfaces of the filtering material, and a third chamber constituting a direct passage between either